(12) United States Patent
Kurimoto et al.

(10) Patent No.: US 10,675,591 B2
(45) Date of Patent: Jun. 9, 2020

(54) HONEYCOMB STRUCTURE

(71) Applicant: NGK INSULATORS, LTD., Nagoya (JP)

(72) Inventors: Yudai Kurimoto, Nagoya (JP); Shogo Hirose, Nagoya (JP); Takahiro Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 161 days.

(21) Appl. No.: 15/464,671

(22) Filed: Mar. 21, 2017

(65) Prior Publication Data
US 2017/0274326 A1   Sep. 28, 2017

(30) Foreign Application Priority Data

Mar. 25, 2016 (JP) ................. 2016-062742

(51) Int. Cl.
| | |
|---|---|
| B01D 69/02 | (2006.01) |
| B01D 46/24 | (2006.01) |
| C04B 38/00 | (2006.01) |
| B01J 37/02 | (2006.01) |
| B01D 69/04 | (2006.01) |
| B01J 23/78 | (2006.01) |
| B01J 29/072 | (2006.01) |
| B01J 35/04 | (2006.01) |
| B01J 37/00 | (2006.01) |

(Continued)

(52) U.S. Cl.
CPC ......... B01D 69/02 (2013.01); B01D 46/2418 (2013.01); B01D 46/2474 (2013.01); B01D 69/04 (2013.01); B01J 23/78 (2013.01); B01J 29/072 (2013.01); B01J 35/04 (2013.01); B01J 37/0018 (2013.01); B01J 37/0201 (2013.01); B01J 37/0246 (2013.01); B01J 37/04 (2013.01); B01J 37/082 (2013.01); C04B 38/0009 (2013.01); *B01D 2046/2433* (2013.01); *B01D 2046/2437* (2013.01); *B01D 2325/028* (2013.01); *B01D 2325/10* (2013.01); *C04B 2111/0081* (2013.01)

(58) Field of Classification Search
CPC .... B01D 2046/2433; B01D 2046/2437; B01D 2046/2418; B01D 69/02; B01D 46/2474
USPC .................................................. 428/116, 118
See application file for complete search history.

(56) References Cited

U.S. PATENT DOCUMENTS

| | | |
|---|---|---|
| 7,527,666 B2 | 5/2009 | Kramer et al. |
| 9,394,814 B2 | 7/2016 | Shibata et al. |

(Continued)

FOREIGN PATENT DOCUMENTS

| | | |
|---|---|---|
| EP | 1 880 763 A2 | 1/2008 |
| JP | 2015-029938 A1 | 2/2015 |

*Primary Examiner* — Tri V Nguyen
(74) *Attorney, Agent, or Firm* — Burr & Brown, PLLC

(57) ABSTRACT

A honeycomb structure comprising: a honeycomb structure body that includes a plurality of porous partition walls and intersection parts, and a catalyst layer, wherein the porosity of the partition wall is 20 to 70%, the average pore diameter of the pores in the partition wall is 1 to 60 μm, a plurality of the partition walls includes a notched partition wall having a recessed part in which at least one end is notched, the ratio of the notched partition wall in the partition walls is 1 to 100%, the recessed part of the notched partition wall has a depth of 10 to 200% of the standard length, and the recessed part of the notched partition wall is a part having a width of 33 to 100% of the standard width.

3 Claims, 2 Drawing Sheets

(51) Int. Cl.
*B01J 37/04* (2006.01)
*B01J 37/08* (2006.01)
C04B 111/00 (2006.01)

(56) References Cited

U.S. PATENT DOCUMENTS

| | | |
|---|---|---|
| 2004/0166035 A1 | 8/2004 | Noda et al. |
| 2004/0209039 A1 | 10/2004 | Ichikawa |
| 2007/0169453 A1* | 7/2007 | Hayakawa ......... B01D 46/2459 55/523 |
| 2009/0246452 A1 | 10/2009 | Ogura et al. |
| 2013/0213620 A1 | 8/2013 | Miyazaki et al. |
| 2015/0037221 A1 | 2/2015 | Shibata et al. |

* cited by examiner

HONEYCOMB STRUCTURE

"The present application is an application based on JP-2016-062742 filed on Mar. 25, 2016 with Japan Patent Office, the entire contents of which are incorporated herein by reference."

BACKGROUND OF THE INVENTION

Field of the Invention

The present invention relates to a honeycomb structure. More specifically, the present invention relates to a honeycomb structure with an improved $NO_X$ purification performance.

Description of the Related Art

Currently, as $NO_X$ control of diesel cars and trucks in developed countries, further stringent conditions have been studied. As a catalyst for treating $NO_X$, an SCR (Selective Catalytic Reduction) catalyst has been generally used, and practically, a honeycomb structure obtained by loading an SCR catalyst (specifically, zeolite or the like) onto a honeycomb-shaped substrate has been known.

As the honeycomb structure described above, those which improve purification performance and the like by setting the sectional shape of cells have been known (see Patent Document 1).

[Patent Document 1] JP-A-2015-29938

SUMMARY OF THE INVENTION

In addition, recently, development of a honeycomb structure having a high porosity has been studied, from the viewpoint of increasing the amount of SCR catalyst for improving the purification rate of $NO_x$, increasing contact of gas with the catalyst by increasing the cell density, and the like.

While such study has been conducted, the honeycomb structure described in Patent Document 1 and the like leaves room for further improvement in $NO_X$ purification performance.

The present invention is made in view of the above-described problem. The present invention provides a honeycomb structure with an improved $NO_X$ purification performance.

According to a first aspect of the present invention, a honeycomb structure is provided comprising: a honeycomb structure body that includes a plurality of porous partition walls which defines a plurality of cells which become through channels for fluid extending from an inflow end face as one end face to an outflow end face as the other end face; and an intersection part at which one partition wall and other partition wall intersect, and a catalyst layer arranged on at least one of the surface of the partition wall of the honeycomb structure body and the inner surface of the pore, wherein the porosity of the partition wall in the state where the catalyst layer is not arranged is 20 to 70%, the average pore diameter of the pores in the partition wall in the state where the catalyst layer is not arranged is 1 to 60 µm, a plurality of the partition walls includes a notched partition wall having a recessed part in which at least one end is notched, the ratio of the notched partition wall in the partition walls is 1 to 100%, and in the state where the catalyst layer is not arranged, when the distance between the centers of the intersection parts adjacent to each other on the end face is defined as a standard length, the recessed part of the notched partition wall has a depth of 10 to 200% of the standard length, and when the distance between the intersection parts adjacent to each other is defined as a standard width, the recessed part of the notched partition wall is a part having a width of 33 to 100% of the standard width.

According to a second aspect of the present invention, the honeycomb structure according to the first aspect is provided, wherein the ratio of the notched partition wall in the partition walls is 1 to 60%.

According to a third aspect of the present invention, the honeycomb structure according to the first or second aspects is provided, wherein, when the distance between the centers of the intersection parts adjacent to each other on the end face is defined as a standard length, the recessed part of the notched partition wall has a depth of 50 to 150% of the standard length.

The honeycomb structure of the present invention has an improved $NO_X$ purification performance.

DESCRIPTION OF THE PREFERRED EMBODIMENTS

Hereinbelow, the embodiments of the present invention are described in reference to the drawings. The present invention is not limited to the following embodiments. It should be understood that the following embodiments to which modifications, improvements and the like are suitably added on the basis of ordinary knowledge of a person skilled in the art without departing from the gist of the present invention also fall in the gist of the present invention.

Figure 2:
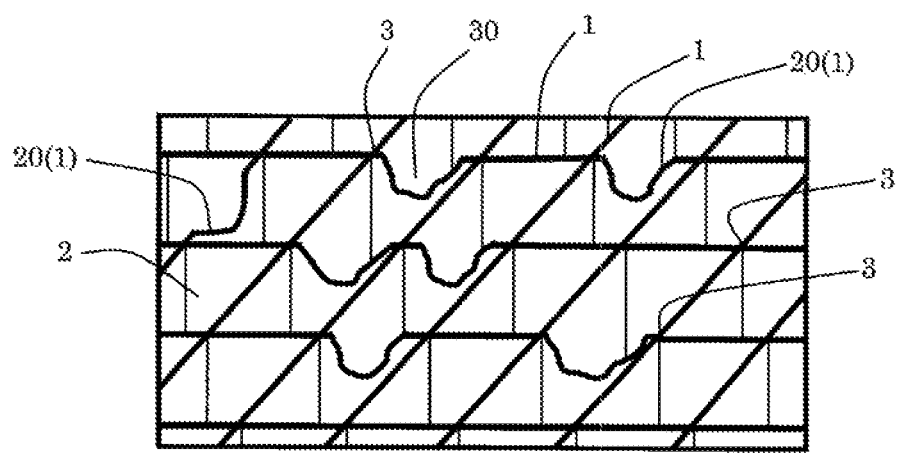
FIG. 2 is a plane view schematically showing an enlarged view of a part of an inflow end face of an embodiment of the honeycomb structure of the present invention.
Figure 3:
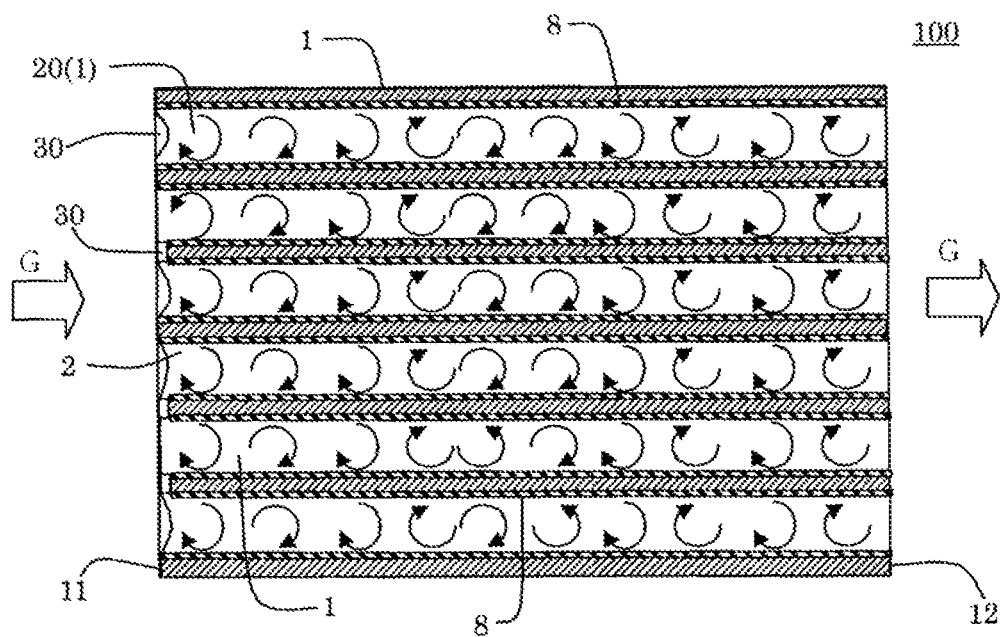
FIG. 3 is a cross-sectional view schematically showing a cross section parallel to a cell extending direction of an embodiment of the honeycomb structure of the present invention.
Figure 4:
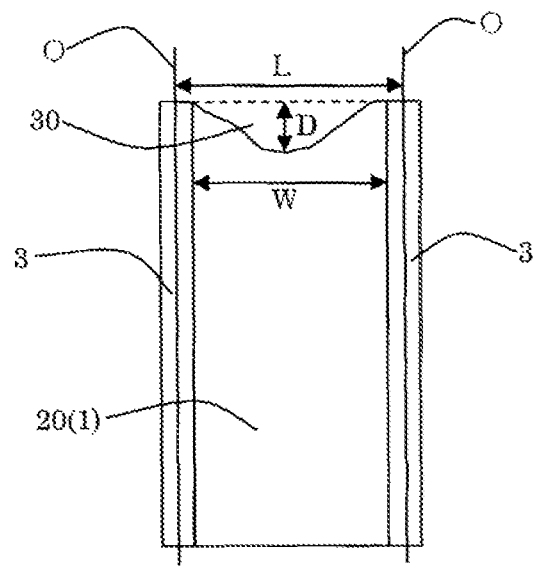
FIG. 4 is a cross-sectional view schematically showing an enlarged view of a part of a cross section parallel to a cell extending direction of an embodiment of the honeycomb structure of the present invention.

(1) Honeycomb Structure:

An embodiment of the honeycomb structure of the present invention is a honeycomb structure 100 as shown in FIG. 1 to FIG. 4. The honeycomb structure 100 includes a honeycomb structure body 10 that includes a plurality of porous partition walls 1 which defines a plurality of cells 2 formed as fluid flow passages extending from an inflow end face 11 as one end face to an outflow end face 12 as the other end face, and an intersection part 3 at which one partition wall 1 and other partition wall 1 intersect. In addition, the honeycomb structure 100 includes a catalyst layer 8 arranged at least on the surface of the partition wall 1 of the honeycomb structure body 10. The honeycomb structure 100 has a porosity of the partition wall 1 of 20 to 70%, and an average pore diameter of the pores in the partition wall 1 of 1 to 60 µm. In the honeycomb structure 100, a plurality of the porous partition walls 1 includes a notched partition wall 20 having a recessed part 30 in which at least one end is notched, and the ratio of the notched partition wall 20 in the partition wall 1 is 1 to 100%. Moreover, the distance between the centers O of the intersection parts 3 adjacent to each other on the end face of the honeycomb structure 100 is defined as a standard length L, and the distance between the intersection parts 3 adjacent to each other is defined as a standard width W. At this time, the recessed part 30 of the notched partition wall 20 has a depth D of 10 to 200% of the standard length L, and corresponds to a part having a width of 33 to 100% of the standard width W. The recessed part 30 as shown in FIG. 4 has a width of 100% of the standard width W. Also, the porosity of the partition wall 1, average pore diameter of the pores, and depth D and width of the recessed part 30 are values in the state where the catalyst layer is not arranged.

In the honeycomb structure 100 as described above, a notched partition wall 20 is present at a prescribed ratio, and thus, air is diffused when exhaust gas G is flown by the recessed part 30 of this notched partition wall 20. Therefore, in the honeycomb structure 100, the chance of contact between the exhaust gas G and the catalyst (catalyst layer) is increased (namely, the contact time and contact area between the exhaust gas G and the catalyst are increased), and $NO_X$ purification performance is improved.

Figure 1:
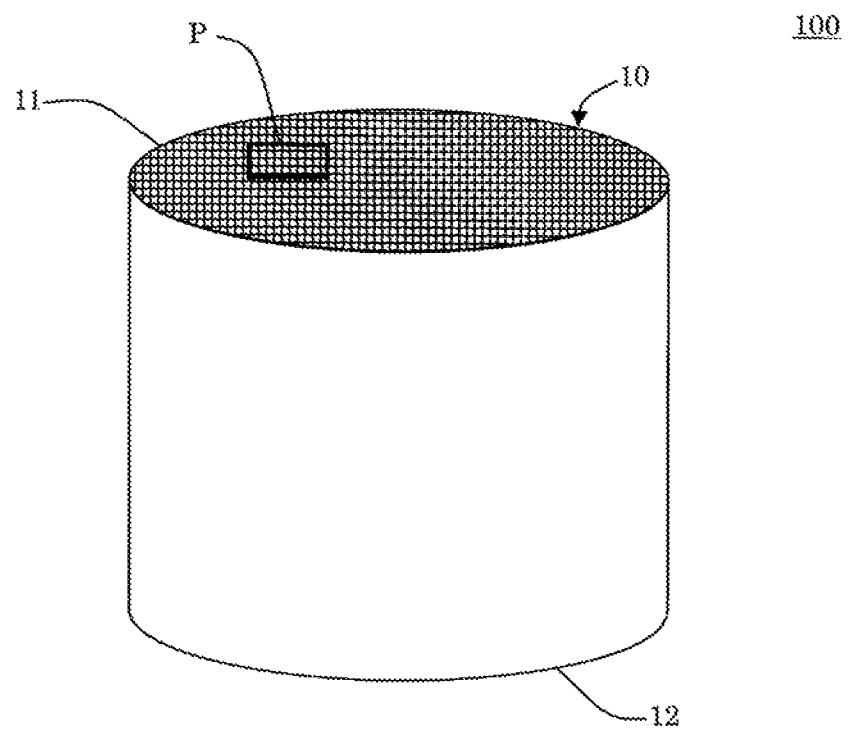
FIG. 1 is a perspective view schematically showing an embodiment of the honeycomb structure of the present invention.

FIG. 1 is a perspective view schematically showing an embodiment of the honeycomb structure of the present invention. FIG. 2 is a plane view schematically showing an enlarged view of an area P that is a part of an inflow end face of an embodiment of the honeycomb structure of the present invention. FIG. 2 is an enlarged view of the end face of the honeycomb structure, seen from an oblique direction with respect to the end face. FIG. 3 is a cross-sectional view schematically showing a cross section parallel to a cell extending direction of an embodiment of the honeycomb structure of the present invention. FIG. 4 is a cross-sectional view schematically showing an enlarged view of a part of a cross section parallel to a cell extending direction of an embodiment of the honeycomb structure of the present invention. FIG. 4 is a cross-sectional view passing through the centers O of the intersection parts 3, among the cross sections parallel to a cell extending direction.

(1-1) Honeycomb Structure Body:

The honeycomb structure body 10 has a plurality of porous partition walls 1, and an intersection part 3 at which one partition wall 1 and other partition wall 1 intersect, as described above. Moreover, a plurality of the porous partition walls 1 includes a notched partition wall 20 having a recessed part 30 in which at least one end is notched. The notched partition wall 20 as described above is included, whereby, in the honeycomb structure 100, air is diffused when the exhaust gas G is flown in the honeycomb structure body 10.

Herein, the "recessed part" refers to those satisfying the above conditions. Namely, a notch that does not satisfy the above conditions does not correspond to the recessed part. Moreover, a notch that satisfies the above conditions is formed, whereby, in the honeycomb structure of the present invention, $NO_X$ purification performance is improved.

The recessed part 30 preferably has a depth D that is 50 to 150% of the standard length L. In other words, when the distance between the centers O of the intersection parts 3 adjacent to each other on the end face is defined as a standard length L, the recessed part 30 of the notched partition wall 20 preferably satisfies a depth of 50 to 150% of the standard length L.

By setting the depth D of the recessed part 30 in the above range, the exhaust gas flown into the honeycomb structure is diffused in the cell by the recessed part. Thus, contact property between the exhaust gas and the catalyst is improved, and $NO_X$ purification performance is improved. When the depth D of the recessed part 30 is less than 10% of the above standard length L, the exhaust gas flown into the honeycomb structure is passed through without diffusing in the cell, and thus, $NO_X$ purification performance is not sufficiently obtained. When the depth D of the recessed part 30 exceeds 200% of the above standard length L, the strength of the honeycomb structure is lowered, and thus, the honeycomb structure may break when stored in a can body.

Herein, the "depth of the recessed part" refers to a distance from the end face of the honeycomb structure body to the farthest part. In FIG. 4, the end face of the honeycomb structure body is shown by a broken line.

The recessed part 30 has a width of 33 to 100% of the standard width W, and has further preferably 50 to 80% of the standard width W. The "width of the recessed part" refers to a widest width of the opening of the recessed part when seeing the recessed part from the end face of the honeycomb structure body.

By setting the width of the recessed part 30 in the above range, the exhaust gas flown into the honeycomb structure is diffused in the cell by the recessed part. Thus, contact property between the exhaust gas and the catalyst is improved, and $NO_X$ purification performance is improved. When the width of the recessed part 30 is less than 33% of the above standard width W, the exhaust gas flown into the honeycomb structure is passed through without diffusing in the cell, and thus, $NO_X$ purification performance is not sufficiently obtained. When the width of the recessed part 30 exceeds 100% of the above standard width W, the strength of the honeycomb structure is lowered, and thus, the honeycomb structure may break when stored in a can body.

The "depth of the recessed part" and "width of the recessed part" are each an average when measuring a total of forty notched partition walls. Specifically, a plurality of partition wall extending directions in the end face of the honeycomb structure is determined, forty notched partition walls existing along each direction are each arbitrarily selected, and these are to be measured. For example, in the case of a honeycomb structure on which a cell having a quadrilateral cell shape in the cross section perpendicular to the cell extending direction is formed, the partition wall extending direction in the end face of the honeycomb structure is two directions (vertical direction and horizontal direction). Therefore, forty notched partition walls existing along each direction (each of vertical direction and horizontal direction) are each arbitrarily selected.

The ratio of the notched partition wall 20 in the partition walls 1 is preferably 1 to 60%, and further preferably 20 to 50%. By setting the ratio of the notched partition wall 20 in the partition walls 1 in the above range, the exhaust gas flown into the honeycomb structure is diffused in the cell by the recessed part. Thus, contact property between the exhaust gas and the catalyst is improved, and $NO_X$ purification performance is improved. When the ratio of the notched partition wall 20 in the partition walls 1 is less than 1%, the exhaust gas flown into the honeycomb structure is passed through without diffusing in the cell, and thus $NO_X$ purification performance is not sufficiently obtained.

The porosity of the partition wall 1 is necessary to be 20 to 70%, preferably 30 to 65%, and particularly preferably 45 to 60%. By setting the porosity in the above range, the exhaust gas flown into the honeycomb structure is diffused in the cell by the recessed part. Thus, contact property between the exhaust gas and the catalyst is improved, and $NO_X$ purification performance is improved. When the porosity of the partition wall is less than 20%, when loading a catalyst onto the honeycomb structure, the catalyst is difficult to infiltrate into pores of the partition wall, and the catalyst tends to load only onto the surface of the partition wall of the honeycomb structure. Therefore, the contact between the catalyst and exhaust gas in the honeycomb structure is deteriorated, and $NO_X$ purification performance is not sufficiently obtained. When the porosity exceeds 70%, the strength of the honeycomb structure is lowered, and thus, the honeycomb structure may break when stored in a can body. The porosity is a value measured by a mercury porosimeter. Herein, the porosity of the partition wall 1 means a porosity of the partition wall 1 in the state where the catalyst layer is not arranged (namely, the state before loading the catalyst).

The average pore diameter of pores in the partition wall 1 is necessary to be 1 to 60 μm, preferably 5 to 55 μm, and particularly preferably 15 to 30 μm. By setting the average pore diameter in the above range, the exhaust gas flown into the honeycomb structure is diffused in the cell by the recessed part. Thus, contact property between the exhaust gas and the catalyst is improved, and $NO_X$ purification performance is improved. When the average pore diameter is less than 1 μm, when loading a catalyst onto the honeycomb structure, the catalyst is difficult to infiltrate into pores of the partition wall, and the catalyst tends to load only onto the surface of the partition wall of the honeycomb structure. When the average pore diameter exceeds 60 μm, the strength of the honeycomb structure is lowered, and thus, the honeycomb structure may break when stored in a can body. The average pore diameter is a value measured by a mercury porosimeter. Herein, the average pore diameter of pores of the partition wall 1 means an average pore diameter of pores of the partition wall 1 in the state where the catalyst layer is not arranged (namely, the state before loading the catalyst).

The thickness of the partition wall 1 is preferably 60 to 300 μm, and particularly preferably 90 to 140 μm. When the thickness of the partition wall 1 is less than the lower limit, the strength of the honeycomb structure 100 may be lowered. When the thickness of the partition wall 1 exceeds the upper limit, the pressure loss of the honeycomb structure may increase.

The cell density of the honeycomb structure body 10 is not particularly limited. The cell density of the honeycomb structure body 10 is preferably 31 to 140 cells/cm$^2$, and particularly preferably 62 to 93 cells/cm$^2$. When the cell density is less than the lower limit, the pressure loss may increase in a short time and the strength of the honeycomb structure 100 may be lowered, when circulating exhaust gas. When the cell density exceeds the upper limit, the pressure loss of the honeycomb structure may increase.

The cell shape (cell shape in the cross section perpendicular to the cell extending direction) of the honeycomb structure body 10 is not particularly limited. The cell shape includes a triangular shape, a quadrilateral shape, a hexagonal shape, an octagonal shape, and combinations of these shapes. Among quadrangles, square or rectangle is preferable.

The honeycomb structure body 10 can contain at least one selected from the group consisting of cordierite, silicon carbide, mullite, aluminum titanate and alumina, as a main component. Also, the honeycomb structure body 10 is preferably at least one selected from the group consisting of cordierite, silicon carbide, mullite, aluminum titanate and alumina. The "main component" herein means a component exceeding 50% by mass of the whole.

There is no particular restriction on the shape of the honeycomb structure body 10. The shape of the honeycomb structure body 10 is preferably a round pillar shape, a pillar shape with oval end faces, a pillar shape with end faces having a polygonal shape such as "a square shape, a rectangular shape, a triangular shape, a pentangular shape, a hexagonal shape or an octagonal shape" or the like. In the honeycomb structure 100 shown in FIG. 1, the shape of the honeycomb structure body 10 is a round pillar shape.

A circumferential coating layer may be formed on the honeycomb structure body 10. The thickness of the circumferential coating layer is preferably 500 to 3000 μm, and further preferably 1000 to 1500 μm. When the thickness of the circumferential coating layer is less than the lower limit, the strength of the honeycomb structure is lowered, and thus the honeycomb structure may break when stored in a can body. When the thickness exceeds the upper limit, the volume of the circumferential coating layer is increased. Thus, thermal shock resistance is lowered, and the circumferential coating layer may break when a temperature difference occurs in the honeycomb structure.

(1-2) Catalyst Layer:

The catalyst layer is a layer arranged at least on the surface of the partition wall. Namely, the catalyst layer may be arranged on the inner surface of the pore, in addition to the surface of the partition wall. Moreover, this catalyst layer is a layer composed of a catalyst such as an SCR catalyst. $NO_X$ in the exhaust gas can be well purified by the catalyst layer.

The thickness of the catalyst layer is not particularly limited, and the thickness of a conventionally known catalyst layer can be properly adopted.

(2) Manufacturing Method of Honeycomb Structure:

The honeycomb structure of the present invention can be manufactured by the following method. That is, the honeycomb structure of the present invention can be manufactured by a method including a honeycomb fired body preparing step, an end face polishing step, and a catalyst loading step. The honeycomb fired body preparing step is a step of preparing a honeycomb fired body. The end face polishing step is a step of polishing the end face of the honeycomb fired body prepared in the honeycomb fired body preparing step with a grinding wheel and wire net to obtain a notched honeycomb fired body. The catalyst loading step is a step of loading a catalyst onto the surface of the partition wall of the notched honeycomb fired body to obtain a honeycomb structure. The "honeycomb fired body" includes a plurality of porous partition walls which defines a plurality of cells formed as fluid flow passages extending from an inflow end face as one end face to an outflow end face as the other end face, and an intersection part at which one partition wall and other partition wall intersect.

Hereinafter, the manufacturing method of the honeycomb structure of the present invention will be described with respect to each step.

(2-1) Honeycomb Fired Body Preparing Step:

The honeycomb fired body preparing step is a step of preparing the honeycomb fired body including porous partition walls formed by firing the ceramic raw material. There is no particular restriction on the method of preparing the honeycomb fired body, and a conventionally known method can be adopted. This honeycomb fired body preparing step specifically includes a forming step and a firing step.

(2-1-1) Forming Step:

Firstly, in the forming step, a ceramic forming raw material containing the ceramic raw material is formed to obtain a honeycomb formed body including the partition walls defining the plurality of cells to become the through channels of the fluid.

The ceramic raw material contained in the ceramic forming raw material is preferably at least one selected from the group consisting of a cordierite forming raw material, cordierite, silicon carbide, a silicon-silicon carbide composite material, mullite, and aluminum titanate. It is to be noted that the cordierite forming raw material is a ceramic raw material blended so as to obtain a chemical composition falling in ranges of 42 to 56% by mass of silica, 30 to 45% by mass of alumina, and 12 to 16% by mass of magnesia. Moreover, the cordierite forming raw material is fired to become cordierite.

Moreover, the ceramic forming raw material can be prepared by mixing the above ceramic raw material with a dispersing medium, an organic binder, an inorganic binder, a pore former, a surfactant and the like. There is no particular restriction on a composition ratio of each raw material, and the composition ratio is preferably determined in accordance with a structure, a material and the like of the honeycomb structure to be prepared.

In the formation of the ceramic forming raw material, the ceramic forming raw material is first kneaded to obtain a kneaded material and then the obtained kneaded material is formed into a honeycomb shape. Examples of the method of kneading the ceramic forming raw material to form the kneaded material include methods using a kneader, a vacuum pugmill or the like. As the method of forming the kneaded material to obtain the honeycomb formed body, for example, known forming methods such as extrusion forming or injection molding can be used. Specifically, a preferable example of the method is that the honeycomb formed body is formed by performing the extrusion forming with a use of a die having a desirable cell shape, partition wall thickness and cell density. A material of the die is preferably cemented carbide which does not easily wear out.

Examples of a shape of the honeycomb formed body include a round pillar-shape, a pillar-shape having an elliptical end face, and a polygonal pillar-shape with end faces having "a square shape, a rectangular shape, a triangular shape, a pentangular shape, a hexagonal shape or an octagonal shape".

Moreover, after the above formation, the obtained honeycomb formed body may be dried. There is no particular restriction on a drying method. Examples of the drying method include hot air drying, microwave drying, dielectric drying, reduced pressure drying, vacuum drying, freeze drying, and the like. Among these methods, the dielectric drying, the microwave drying, the hot air drying or combination thereof is preferably performed.

(2-1-2) Firing Step:

Next, the honeycomb formed body is fired to prepare a honeycomb fired body. The firing (main firing) of the honeycomb formed body is performed for the purpose of sintering and densifying the forming raw material constituting the calcinated honeycomb formed body to acquire a predetermined strength. Firing conditions (temperature, time, atmosphere, and the like) vary in accordance with the type of the forming raw material, and hence suitable conditions may be selected in accordance with the type. For example, when the cordierite forming raw material is used, the firing temperature is preferably from 1410 to 1440° C. Moreover, the firing time, as time to keep the highest temperature, is preferably from 4 to 8 hours. As a device performing the calcinating and main firing, an electric furnace, a gas furnace or the like can be used.

(2-2) End Face Polishing Step:

The end face polishing step is a step of polishing the end face of the honeycomb fired body with a grinding wheel and wire net to obtain a notched honeycomb fired body. As a grinding wheel, for example, #120 to #1000 grinding wheels and the like can be adopted. The polishing method by a grinding wheel can properly adopt a method such that a recessed part is formed at the end of the partition wall. For example, the end face of the honeycomb structure is strongly polished so as to bring a polishing part of the grinding wheel into contact with, particularly, the partition wall of the honeycomb structure, whereby a recessed part can be formed at the end of the partition wall. At this time, the direction where the grinding wheel is moved is not particularly limited, but a direction along the thickness direction of the partition wall (90° direction to the wall surface of the partition wall) is preferable. Specifically, in the case of a honeycomb structure on which a cell having a quadrilateral cell shape in the cross section perpendicular to the cell extending direction is formed, it is preferable that the grinding wheel is moved to one direction or reciprocated, so as to direct from one side to other side of the opposing partition walls. Since two pairs of facing partition walls exist in the honeycomb structure on which a quadrilateral cell is formed, it is preferable that the grinding wheel is moved so as to direct from one side to other side of the opposing partition walls, in each pair of facing partition walls.

(2-3) Catalyst Loading Step:

The present step is a step of loading a catalyst onto the surface of the partition wall of the notched honeycomb fired body to obtain a honeycomb structure. The method of loading a catalyst onto the notched honeycomb fired body can properly adopt a conventionally known method.

The catalyst to be loaded includes an SCR catalyst and the like.

(2-4) Other Steps:

A circumferential coating material may be applied to a circumference of the notched honeycomb fired body obtained via the end face polishing step to form a circumferential coating layer. By forming the circumferential coating layer, the honeycomb structure can be prevented from chipping when an external force is applied to the honeycomb structure.

The circumferential coating material includes those obtained by adding an additive such as an organic binder, foamable resin and a dispersing agent to an inorganic raw material such as an inorganic fiber, colloidal silica, clay and SiC particles, further adding water thereto and kneading the materials. The method of applying a circumferential coating material includes a method of coating the "cut honeycomb fired body" with a use of rubber spatula or the like while rotating the fired body on a potter's wheel, and the like.

EXAMPLES

Hereinafter, the present invention will further specifically be described based on examples. The present invention is not limited to these examples.

Example 1

First, using a forming raw material containing a ceramic raw material, a kneaded material for forming a honeycomb formed body was prepared. A cordierite forming raw material was used as a ceramic raw material. A dispersing medium, an organic binder, a dispersing agent and a pore former were added to a cordierite forming raw material to prepare a kneaded material for forming. The addition amount of the dispersing medium was 50 parts by mass based on 100 parts by mass of the cordierite forming raw material. The addition amount of the organic binder was 5 parts by mass based on 100 parts by mass of the cordierite forming raw material. The addition amount of the pore former was 5 parts by mass based on 100 parts by mass of the cordierite forming raw material. The resulting ceramic forming raw material was kneaded using a kneader to obtain a kneaded material.

Next, the resulting kneaded material was extruded using a vacuum extrusion molding machine to obtain a honeycomb formed body.

Next, the obtained honeycomb formed body was dried by high frequency dielectric heating and then dried at 120° C. for 2 hours by use of a hot-air drying machine. Thereafter, the honeycomb formed body was fired at 1400° C. for 8 hours to obtain a round pillar-shaped honeycomb fired body.

Next, the end face of the obtained honeycomb fired body was polished with #400 grinding wheel, and a recessed part was formed at the end of a part of the partition walls to obtain a notched honeycomb fired body having a notched partition wall. When polishing with the grinding wheel, the grinding wheel was moved along 90° direction to the wall surface of the partition wall.

Next, a catalyst was loaded onto the surface of the partition wall of the obtained notched honeycomb fired body to prepare a honeycomb structure. A catalyst species was copper zeolite, and the catalyst amount was 120 g/L.

The obtained honeycomb structure had a round shape with a diameter of the cross section perpendicular to the cell extending direction of 330.2 mm. Also, the honeycomb structure had a length in the cell extending direction of 152.4 mm. Moreover, the honeycomb structure had a cell density of 62 cells/cm$^2$ and a thickness of the partition wall of 110 μm. Each measurement value of the honeycomb structure is shown in Table 1.

TABLE 1

| | Partition wall thickness (mm) | Cell density (cells/cm$^2$) | Cell pitch (mm) | [Cell pitch]-[Partition wall thickness] (mm) | Porosity (%) | Average pore diameter (μm) | Diameter (mm) | Major axis | Minor axis | Sectional shape | Full length (mm) | Cell shape |
|---|---|---|---|---|---|---|---|---|---|---|---|---|
| Comparative Example 1 | 0.11 | 62 | 1.27 | 1.16 | 35 | 3 | 330.2 | — | — | Round | 152.4 | Square |
| Comparative Example 2 | 0.11 | 62 | 1.27 | 1.16 | 35 | 3 | 330.2 | — | — | Round | 152.4 | Square |
| Comparative Example 3 | 0.11 | 62 | 1.27 | 1.16 | 35 | 3 | 330.2 | — | — | Round | 152.4 | Square |
| Comparative Example 4 | 0.11 | 62 | 1.27 | 1.16 | 35 | 3 | 330.2 | — | — | Round | 152.4 | Square |
| Comparative Example 5 | 0.11 | 62 | 1.27 | 1.16 | 35 | 3 | 330.2 | — | — | Round | 152.4 | Square |
| Comparative Example 6 | 0.11 | 62 | 1.27 | 1.16 | 35 | 3 | 330.2 | — | — | Round | 152.4 | Square |
| Comparative Example 7 | 0.11 | 62 | 1.27 | 1.16 | 18 | 2 | 330.2 | — | — | Round | 152.4 | Square |
| Comparative Example 8 | 0.11 | 62 | 1.27 | 1.16 | 71 | 40 | 330.2 | — | — | Round | 152.4 | Square |
| Comparative Example 9 | 0.11 | 62 | 1.27 | 1.16 | 22 | 0.8 | 330.2 | — | — | Round | 152.4 | Square |
| Comparative Example 10 | 0.11 | 62 | 1.27 | 1.16 | 50 | 62 | 330.2 | — | — | Round | 152.4 | Square |
| Comparative Example 11 | 0.11 | 62 | 1.27 | 1.16 | 35 | 3 | 330.2 | — | — | Round | 152.4 | Square |
| Example 1 | 0.11 | 62 | 1.27 | 1.16 | 20 | 3 | 330.2 | — | — | Round | 152.4 | Square |
| Example 2 | 0.11 | 62 | 1.27 | 1.16 | 35 | 1 | 330.2 | — | — | Round | 152.4 | Square |
| Example 3 | 0.11 | 62 | 1.27 | 1.16 | 35 | 3 | 330.2 | — | — | Round | 152.4 | Square |
| Example 4 | 0.11 | 62 | 1.27 | 1.16 | 35 | 3 | 330.2 | — | — | Round | 152.4 | Square |
| Example 5 | 0.11 | 62 | 1.27 | 1.16 | 35 | 3 | 330.2 | — | — | Round | 152.4 | Square |
| Example 6 | 0.11 | 62 | 1.27 | 1.16 | 35 | 3 | 330.2 | — | — | Round | 152.4 | Square |
| Example 7 | 0.11 | 62 | 1.27 | 1.16 | 35 | 3 | 330.2 | — | — | Round | 152.4 | Square |
| Example 8 | 0.11 | 62 | 1.27 | 1.16 | 35 | 3 | 330.2 | — | — | Round | 152.4 | Square |
| Example 9 | 0.11 | 62 | 1.27 | 1.16 | 35 | 3 | 330.2 | — | — | Round | 152.4 | Square |
| Example 10 | 0.11 | 62 | 1.27 | 1.16 | 35 | 3 | 330.2 | — | — | Round | 152.4 | Square |
| Example 11 | 0.11 | 62 | 1.27 | 1.16 | 35 | 3 | 330.2 | — | — | Round | 152.4 | Square |
| Example 12 | 0.11 | 62 | 1.27 | 1.16 | 35 | 3 | 76.2 | — | — | Round | 40 | Square |
| Example 13 | 0.11 | 62 | 1.27 | 1.16 | 35 | 3 | 406.4 | — | — | Round | 431.8 | Square |
| Example 14 | 0.11 | 62 | 1.27 | 1.16 | 35 | 3 | — | 228.6 | 137.2 | Oval | 203.2 | Square |
| Example 15 | 0.11 | 62 | 1.27 | 1.16 | 35 | 3 | — | 122.0 | 104.0 | Trapezoid | 125.0 | Square |
| Example 16 | 0.14 | 62 | 1.27 | 1.13 | 51 | 25 | 330.2 | — | — | Round | 152.4 | Square |
| Example 17 | 0.14 | 62 | 1.27 | 1.13 | 68 | 58 | 330.2 | — | — | Round | 152.4 | Square |
| Example 18 | 0.14 | 62 | 1.27 | 1.13 | 70 | 40 | 330.2 | — | — | Round | 153.4 | Square |
| Example 19 | 0.14 | 62 | 1.27 | 1.13 | 55 | 60 | 330.2 | — | — | Round | 154.4 | Square |
| Example 20 | 0.09 | 93 | 1.04 | 0.95 | 35 | 3 | 330.2 | — | — | Round | 152.4 | Square |
| Example 21 | 0.09 | 93 | 1.04 | 0.95 | 35 | 3 | 330.2 | — | — | Round | 152.4 | Square |
| Example 22 | 0.09 | 93 | 1.04 | 0.95 | 35 | 3 | 330.2 | — | — | Round | 152.4 | Square |
| Example 23 | 0.09 | 93 | 1.04 | 0.95 | 35 | 3 | 330.2 | — | — | Round | 152.4 | Square |
| Example 24 | 0.09 | 93 | 1.04 | 0.95 | 35 | 3 | 330.2 | — | — | Round | 152.4 | Square |
| Example 25 | 0.09 | 93 | 1.04 | 0.95 | 35 | 3 | 330.2 | — | — | Round | 152.4 | Square |
| Example 26 | 0.09 | 93 | 1.04 | 0.95 | 35 | 3 | 330.2 | — | — | Round | 152.4 | Square |
| Example 27 | 0.09 | 93 | 1.04 | 0.95 | 35 | 3 | 330.2 | — | — | Round | 152.4 | Square |
| Example 28 | 0.09 | 93 | 1.04 | 0.95 | 35 | 3 | 330.2 | — | — | Round | 152.4 | Square |
| Example 29 | 0.09 | 93 | 1.04 | 0.95 | 35 | 3 | 330.2 | — | — | Round | 152.4 | Square |

Moreover, the recessed part of the notched partition wall (see FIG. 4) had a width of 0.40 mm, and a depth D of 0.20 mm. The width and depth of the recessed part were set to values obtained by arbitrarily selecting arbitrary forty notched partition walls in the end face of the honeycomb structure in the cross direction and calculating the average thereof.

As to the obtained honeycomb structure, evaluation of "purification rate" and "isostatic strength" were each conducted by the methods shown below. The result is shown in Table 1.

(Purification Rate)

First, a test gas containing $NO_X$ was flown into a honeycomb structure. Thereafter, the $NO_X$ amount of gas emitted from this honeycomb structure was analyzed by a gas analyzer.

The temperature of the test gas flown into the honeycomb structure was set to 200° C. The temperature of the honeycomb structure and the test gas was adjusted by a heater. As the heater, an infrared image furnace was used. As the test gas, a gas obtained by mixing, into nitrogen, 5% by volume of carbon dioxide, 14% by volume of oxygen, 350 ppm (volume base) of nitrogen monoxide, 350 ppm (volume base) of ammonia and 10% by volume of water was used. Regarding this test gas, water and a mixed gas obtained by mixing other gases were separately prepared, and these were mixed in the piping when performing the test and used. As the gas analyzer, "MEXA9100EGR, manufactured by HORIBA, Ltd." was used. Also, the space velocity when the test gas was flown into the honeycomb structure was set to 100,000 ($hour^{-1}$).

The "$NO_X$ purification rate" is a value obtained by dividing a value subtracting the $NO_X$ amount of the gas emitted from the honeycomb structure from the $NO_X$ amount of the test gas by the $NO_X$ amount of the test gas, and multiplying the obtained value by 100. In the evaluation of purification performance, it was defined as "A" when the $NO_X$ purification rate was increased by 20% or more, based on the $NO_X$ purification rate of the standard honeycomb catalyzer. It was defined as "B" when the $NO_X$ purification rate was increased by 10% or more and less than 20%. It was defined as "C" when the $NO_X$ purification rate was increased by 5% or more and less than 10%. It was defined as "D" when the $NO_X$ purification rate was increased by 0% or more and less than 5% or the $NO_X$ purification rate was reduced. In the evaluation of purification performance, it was defined as pass in the cases of A to C, and defined as fail in the case of D. The phrase "when the $NO_X$ purification rate was increased by 20% or more, based on the $NO_X$ purification rate of the standard honeycomb catalyzer" means that the value obtained by subtracting the $NO_X$ purification rate of the standard honeycomb catalyzer from the calculated $NO_X$ purification rate is 20% or more. That is, when the calculated $NO_X$ purification rate is 61%, and the $NO_X$ purification rate of the standard honeycomb catalyzer is 50%, 11% that is a value obtained by subtracting 50% from 61% is an increased value. Then, the evaluation in this case is "B".

(Isostatic Strength)

The isostatic strength was measured on the basis of an isostatic breaking strength test stipulated in car standard (JASO standard) M505-87 issued by Society of Automotive Engineers of Japan. The isostatic breaking strength test is a test in which a honeycomb structure is disposed in a rubber columnar container and the container is closed with a lid of a plate made of aluminum, to carry out isotropic pressurizing compression in water.

That is, the isostatic breaking strength test is a test to simulate a compressive load application in a case where a circumferential surface of the honeycomb structure is held by a can body. The isostatic strength measured by the isostatic breaking strength test is indicated by an applied pressure value (MPa) when the honeycomb catalyzer breaks.

A case where the isostatic strength is 1.0 MPa or more is defined as "OK" (pass), and a case where the isostatic strength is less than 1.0 MPa is "NG" (fail).

TABLE 2

| | Partition wall thickness (mm) | Cell density (cells/cm$^2$) | Cell pitch (mm) | [Cell pitch]-[Partition wall thickness] (mm) | Porosity (%) | Average pore diameter (μm) | Diameter (mm) | Major axis | Minor axis | Sectional shape | Full length (mm) | Cell shape |
|---|---|---|---|---|---|---|---|---|---|---|---|---|
| Example 30 | 0.06 | 140 | 0.85 | 0.78 | 27 | 3 | 330.2 | — | — | Round | 152.4 | Square |
| Example 31 | 0.06 | 140 | 0.85 | 0.78 | 27 | 3 | 330.2 | — | — | Round | 152.4 | Square |
| Example 32 | 0.06 | 140 | 0.85 | 0.78 | 27 | 3 | 330.2 | — | — | Round | 152.4 | Square |
| Example 33 | 0.06 | 140 | 0.85 | 0.78 | 27 | 3 | 330.2 | — | — | Round | 152.4 | Square |
| Example 34 | 0.06 | 140 | 0.85 | 0.78 | 27 | 3 | 330.2 | — | — | Round | 152.4 | Square |
| Example 35 | 0.06 | 140 | 0.85 | 0.78 | 27 | 3 | 330.2 | — | — | Round | 152.4 | Square |
| Example 36 | 0.06 | 140 | 0.85 | 0.78 | 27 | 3 | 330.2 | — | — | Round | 152.4 | Square |
| Example 37 | 0.06 | 140 | 0.85 | 0.78 | 27 | 3 | 330.2 | — | — | Round | 152.4 | Square |
| Example 38 | 0.06 | 140 | 0.85 | 0.78 | 27 | 3 | 330.2 | — | — | Round | 152.4 | Square |
| Example 39 | 0.06 | 140 | 0.85 | 0.78 | 27 | 5 | 330.2 | — | — | Round | 152.4 | Square |
| Example 40 | 0.30 | 31 | 1.80 | 1.49 | 35 | 3 | 330.2 | — | — | Round | 152.4 | Square |
| Example 41 | 0.30 | 31 | 1.80 | 1.49 | 35 | 3 | 330.2 | — | — | Round | 152.4 | Square |
| Example 42 | 0.30 | 31 | 1.80 | 1.49 | 35 | 3 | 330.2 | — | — | Round | 152.4 | Square |
| Example 43 | 0.30 | 31 | 1.80 | 1.49 | 35 | 3 | 330.2 | — | — | Round | 152.4 | Square |
| Example 44 | 0.30 | 31 | 1.80 | 1.49 | 35 | 3 | 330.2 | — | — | Round | 152.4 | Square |
| Example 45 | 0.30 | 31 | 1.80 | 1.49 | 35 | 3 | 330.2 | — | — | Round | 152.4 | Square |
| Example 46 | 0.30 | 31 | 1.80 | 1.49 | 35 | 3 | 330.2 | — | — | Round | 152.4 | Square |
| Example 47 | 0.30 | 31 | 1.80 | 1.49 | 35 | 3 | 330.2 | — | — | Round | 152.4 | Square |
| Example 48 | 0.30 | 31 | 1.80 | 1.49 | 35 | 3 | 330.2 | — | — | Round | 152.4 | Square |
| Example 49 | 0.30 | 31 | 1.80 | 1.49 | 35 | 5 | 330.2 | — | — | Round | 152.4 | Square |
| Example 50 | 0.11 | 62 | 1.36 | 1.25 | 35 | 3 | 330.2 | — | — | Round | 152.4 | Hexagon |
| Example 51 | 0.11 | 62 | 1.36 | 1.25 | 35 | 3 | 330.2 | — | — | Round | 152.4 | Hexagon |
| Example 52 | 0.11 | 62 | 1.36 | 1.25 | 35 | 3 | 330.2 | — | — | Round | 152.4 | Hexagon |
| Example 53 | 0.11 | 62 | 1.36 | 1.25 | 35 | 3 | 330.2 | — | — | Round | 152.4 | Hexagon |
| Example 54 | 0.11 | 62 | 1.36 | 1.25 | 35 | 3 | 330.2 | — | — | Round | 152.4 | Hexagon |
| Example 55 | 0.11 | 62 | 1.36 | 1.25 | 35 | 3 | 330.2 | — | — | Round | 152.4 | Hexagon |

TABLE 2-continued

| | Partition wall thickness (mm) | Cell density (cells/cm²) | Cell pitch (mm) | [Cell pitch]-[Partition wall thickness] (mm) | Porosity (%) | Average pore diameter (μm) | Diameter (mm) | Major axis | Minor axis | Sectional shape | Full length (mm) | Cell shape |
|---|---|---|---|---|---|---|---|---|---|---|---|---|
| Example 56 | 0.11 | 62 | 1.36 | 1.25 | 35 | 3 | 330.2 | — | — | Round | 152.4 | Hexagon |
| Example 57 | 0.11 | 62 | 1.36 | 1.25 | 35 | 3 | 330.2 | — | — | Round | 152.4 | Hexagon |
| Example 58 | 0.11 | 62 | 1.36 | 1.25 | 35 | 3 | 330.2 | — | — | Round | 152.4 | Hexagon |
| Example 59 | 0.11 | 62 | 1.36 | 1.25 | 35 | 5 | 330.2 | — | — | Round | 152.4 | Hexagon |

TABLE 3

| | Recess width/([Cell pitch]-[Partition wall thickness]) (%) | Recess width (mm) | Recess depth/Cell pitch (%) | Recess depth (mm) | Recess rate (%) | Purification rate (200° C., SV = 100000/h) (%) | Evaluation | Isostatic strength (MPa) | Evaluation |
|---|---|---|---|---|---|---|---|---|---|
| Comparative Example 1 | 0 | 0 | 0 | 0.00 | 0 | 50 | Ref | 3.5 | OK |
| Comparative Example 2 | 0 | 0 | 0 | 0.00 | 0 | 50 | Ref | 3.4 | OK |
| Comparative Example 3 | 0 | 0 | 0 | 0.00 | 0 | 50 | Ref | 4.1 | OK |
| Comparative Example 4 | 56 | 0.65 | 213 | 2.70 | 100 | 72 | A | 0.8 | NG |
| Comparative Example 5 | 48 | 0.55 | 8 | 0.10 | 3 | 51 | D | 3.2 | OK |
| Comparative Example 6 | 30 | 0.35 | 87 | 1.10 | 1 | 51 | D | 3.1 | OK |
| Comparative Example 7 | 35 | 0.40 | 13 | 0.16 | 5 | 54 | D | 4.0 | OK |
| Comparative Example 8 | 52 | 0.60 | 14 | 0.18 | 5 | 65 | B | 0.5 | NG |
| Comparative Example 9 | 43 | 0.50 | 16 | 0.20 | 6 | 54 | D | 3.5 | OK |
| Comparative Example 10 | 69 | 0.80 | 24 | 0.30 | 10 | 50 | D | 0.9 | NG |
| Comparative Example 11 | 35 | 0.40 | 12 | 0.15 | 0.5 | 54 | D | 3.5 | OK |
| Example 1 | 35 | 0.40 | 16 | 0.20 | 1 | 61 | B | 3.4 | OK |
| Example 2 | 39 | 0.45 | 24 | 0.30 | 3 | 60 | B | 3.4 | OK |
| Example 3 | 33 | 0.38 | 12 | 0.15 | 1 | 61 | B | 3.4 | OK |
| Example 4 | 53 | 0.61 | 39 | 0.50 | 5 | 63 | B | 3.2 | OK |
| Example 5 | 61 | 0.7 | 63 | 0.80 | 9 | 64 | B | 3.1 | OK |
| Example 6 | 69 | 0.8 | 56 | 0.71 | 20 | 65 | B | 3 | OK |
| Example 7 | 95 | 1.1 | 79 | 1.00 | 29 | 68 | B | 2.6 | OK |
| Example 8 | 52 | 0.6 | 87 | 1.10 | 41 | 70 | A | 2.5 | OK |
| Example 9 | 62 | 0.72 | 102 | 1.30 | 52 | 73 | A | 2.2 | OK |
| Example 10 | 56 | 0.65 | 142 | 1.80 | 70 | 75 | A | 1.6 | OK |
| Example 11 | 92 | 1.06 | 193 | 2.45 | 100 | 77 | A | 1.5 | OK |
| Example 12 | 52 | 0.60 | 80 | 1.02 | 52 | 72 | A | 2.2 | OK |
| Example 13 | 50 | 0.58 | 83 | 1.05 | 51 | 73 | A | 2.0 | OK |
| Example 14 | 61 | 0.70 | 83 | 1.06 | 55 | 70 | A | 2.1 | OK |
| Example 15 | 69 | 0.80 | 87 | 1.10 | 51 | 69 | B | 1.9 | OK |
| Example 16 | 62 | 0.70 | 126 | 1.60 | 49 | 69 | B | 1.7 | OK |
| Example 17 | 94 | 1.06 | 142 | 1.80 | 100 | 83 | A | 1.2 | OK |
| Example 18 | 71 | 0.80 | 118 | 1.50 | 90 | 80 | A | 1.2 | OK |
| Example 19 | 84 | 0.95 | 134 | 1.70 | 90 | 78 | A | 1.3 | OK |
| Example 20 | 37 | 0.35 | 10 | 0.10 | 1 | 61 | B | 3 | OK |
| Example 21 | 64 | 0.61 | 43 | 0.45 | 5 | 61 | B | 2.9 | OK |
| Example 22 | 74 | 0.7 | 96 | 1.00 | 9 | 63 | B | 2.8 | OK |
| Example 23 | 84 | 0.8 | 116 | 1.20 | 20 | 65 | B | 2.6 | OK |
| Example 24 | 95 | 0.9 | 77 | 0.80 | 29 | 68 | B | 2.6 | OK |
| Example 25 | 63 | 0.6 | 82 | 0.85 | 41 | 70 | A | 2.5 | OK |
| Example 26 | 76 | 0.72 | 125 | 1.30 | 52 | 71 | A | 2.2 | OK |
| Example 27 | 69 | 0.65 | 147 | 1.52 | 61 | 75 | B | 1.6 | OK |
| Example 28 | 64 | 0.61 | 154 | 1.60 | 82 | 80 | A | 1.5 | OK |
| Example 29 | 90 | 0.85 | 188 | 1.95 | 100 | 84 | A | 1.5 | OK |

TABLE 4

| | Recess width/ ([Cell pitch]-[Partition wall thickness]) (%) | Recess width (mm) | Recess depth/ Cell pitch (%) | Recess depth (mm) | Recess rate (%) | Purification rate (200° C., SV = 100000/h) (%) | Evaluation | Isostatic strength (MPa) | Evaluation |
|---|---|---|---|---|---|---|---|---|---|
| Example 30 | 38 | 0.30 | 14 | 0.12 | 1 | 62 | B | 2.8 | OK |
| Example 31 | 78 | 0.61 | 53 | 0.45 | 5 | 63 | B | 2.6 | OK |
| Example 32 | 89 | 0.7 | 142 | 1.20 | 9 | 63 | B | 2.5 | OK |
| Example 33 | 91 | 0.71 | 84 | 0.71 | 20 | 65 | B | 2.4 | OK |
| Example 34 | 83 | 0.65 | 154 | 1.30 | 29 | 68 | B | 2.3 | OK |
| Example 35 | 77 | 0.6 | 165 | 1.40 | 41 | 70 | A | 2.2 | OK |
| Example 36 | 92 | 0.72 | 142 | 1.20 | 52 | 71 | A | 2.1 | OK |
| Example 37 | 83 | 0.65 | 130 | 1.10 | 61 | 75 | A | 1.6 | OK |
| Example 38 | 78 | 0.61 | 154 | 1.30 | 75 | 78 | A | 1.5 | OK |
| Example 39 | 96 | 0.75 | 195 | 1.65 | 100 | 80 | A | 1.5 | OK |
| Example 40 | 35 | 0.52 | 13 | 0.23 | 1 | 58 | C | 4 | OK |
| Example 41 | 41 | 0.61 | 25 | 0.45 | 5 | 59 | C | 3.8 | OK |
| Example 42 | 54 | 0.8 | 67 | 1.20 | 9 | 60 | B | 3.6 | OK |
| Example 43 | 60 | 0.9 | 40 | 0.71 | 20 | 61 | B | 3.4 | OK |
| Example 44 | 67 | 1 | 128 | 2.30 | 29 | 62 | B | 3.1 | OK |
| Example 45 | 80 | 1.2 | 145 | 2.60 | 41 | 63 | B | 2.5 | OK |
| Example 46 | 64 | 0.95 | 139 | 2.50 | 52 | 64 | B | 2.2 | OK |
| Example 47 | 80 | 1.2 | 148 | 2.65 | 61 | 65 | B | 2.1 | OK |
| Example 48 | 67 | 1 | 161 | 2.90 | 80 | 68 | B | 2.1 | OK |
| Example 49 | 87 | 1.3 | 189 | 3.40 | 100 | 69 | B | 1.9 | OK |
| Example 50 | 40 | 0.50 | 15 | 0.20 | 1 | 61 | B | 3.4 | OK |
| Example 51 | 49 | 0.61 | 33 | 0.45 | 5 | 62 | B | 4.1 | OK |
| Example 52 | 56 | 0.7 | 52 | 0.71 | 9 | 63 | B | 3.5 | OK |
| Example 53 | 64 | 0.8 | 88 | 1.20 | 20 | 65 | B | 3.6 | OK |
| Example 54 | 88 | 1.1 | 169 | 2.30 | 29 | 68 | B | 2.6 | OK |
| Example 55 | 48 | 0.6 | 132 | 1.80 | 41 | 70 | A | 2.5 | OK |
| Example 56 | 58 | 0.72 | 154 | 2.10 | 52 | 72 | A | 2.2 | OK |
| Example 57 | 52 | 0.65 | 169 | 2.30 | 61 | 75 | A | 1.6 | OK |
| Example 58 | 49 | 0.61 | 184 | 2.50 | 85 | 80 | A | 1.5 | OK |
| Example 59 | 96 | 1.2 | 195 | 2.65 | 100 | 83 | A | 1.5 | OK |

In Table 3 and Table 4, the "recess width" shows a length in the extending direction of the recessed part formed on the notched partition wall in the end face (in FIG. 4, a length of the recessed part in the direction shown by reference numeral "W"). The "cell pitch" shows a distance between the centers of the intersection parts adjacent to each other on the end face (standard length) L (see FIG. 4). The "recess depth" shows a depth of the recessed part (namely, a distance from the end face on the side on which the recessed part is formed to the farthest part) D (see FIG. 4). The "recess rate" shows a rate (%) of the notched partition wall in all partition walls.

Examples 2 to 59, Comparative Examples 1 to 11

Honeycomb structures were obtained in the same manner as in Example 1, except for changing the conditions as shown in Table 1 and Table 2. As to the obtained honeycomb structures, evaluation of "purification rate" and "isostatic strength" were each conducted. The results are shown in Table 3 and Table 4.

Based on Table 3 and Table 4, the honeycomb structures of Examples 1 to 59 have an improved $NO_X$ purification performance, as compared to the honeycomb structures of Comparative Examples 1 to 11. Also, it is understood that, even when a notch in the range specified in the present invention exists at least on one end face of the honeycomb structure, for improvement in purification performance, the isostatic strength of the honeycomb structure maintains 1.0 MPa that is a practical lower limit.

The honeycomb structure of the present invention can be suitably used as a filter for purifying exhaust gas from automobiles and the like.

DESCRIPTION OF REFERENCE NUMERALS

1: Partition wall, 2: Cell, 3: Intersection part, 10: Honeycomb structure body, 11: Inflow end face, 12: Outflow end face, 8: Catalyst layer, 20: Notched partition wall, 30: Recessed part, 100: Honeycomb structure, D: Depth, L: Standard length, O: Center, P: Area, W: Standard width.

What is claimed is:

1. A honeycomb structure comprising:
a honeycomb structure body that includes a plurality of porous partition walls which define a plurality of cells which become through channels for fluid extending from an inflow end face as one end face to an outflow end face as the other end face, and an intersection part at which one partition wall and an other partition wall intersect, and
a catalyst layer arranged on at least one of a surface of the partition wall of the honeycomb structure body and an inner surface of a pore in the partition wall,
wherein a porosity of the partition wall in the state where the catalyst layer is not arranged is 20 to 70%,
an average pore diameter of the pores in the partition wall in the state where the catalyst layer is not arranged is 1 to 60 μm,
a plurality of the partition walls includes a notched partition wall having a recessed part in which at least one end of the partition wall is notched,
a ratio of the notched partition walls to all of the partition walls is 1 to 100%, and
when a distance between the centers of intersection parts adjacent to each other on the end face is defined as a standard length, in the state where the catalyst layer is not arranged, the recessed part of each notched partition wall is a part having a depth of 10 to 200% of the standard length, and when a distance between the intersection parts adjacent to each other is defined as a standard width, the recessed part of each notched partition wall is a part having a width 33 to 100% of the standard width.

2. The honeycomb structure according to claim 1, wherein the ratio of the notched partition wall in the partition walls is 1 to 60%.

3. The honeycomb structure according to claim 1, wherein, when a distance between the centers of the intersection parts adjacent to each other on the end face is defined as a standard length, the recessed part of each notched partition wall has a depth of 50 to 150% of the standard length.

* * * * *